United States Patent
Wood

(10) Patent No.: US 7,217,210 B2
(45) Date of Patent: May 15, 2007

(54) TOOTH SHEAR RESISTANT POWER TRANSMISSION BELT

(75) Inventor: Douglas Bruce Wood, Lincoln, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 493 days.

(21) Appl. No.: 10/811,254

(22) Filed: Mar. 26, 2004

(65) Prior Publication Data
US 2005/0215372 A1    Sep. 29, 2005

(51) Int. Cl.
*F16G 5/10* (2006.01)
(52) U.S. Cl. .................................. 474/260
(58) Field of Classification Search ............ 474/237, 474/238, 239, 240, 249, 260, 261, 265; 156/137
See application file for complete search history.

(56) References Cited

U.S. PATENT DOCUMENTS

| | | | | |
|---|---|---|---|---|
| 3,941,162 A * | 3/1976 | McCabe et al. | ........ | 139/383 R |
| 3,973,670 A | 8/1976 | Spaar | .......................... | 198/193 |
| 4,395,298 A | 7/1983 | Wetzel et al. | ................ | 156/137 |
| 4,861,323 A * | 8/1989 | Kobayashi et al. | ......... | 474/260 |
| 5,322,479 A * | 6/1994 | Le Devehat | ................. | 474/101 |
| 5,421,789 A | 6/1995 | Gregg | .......................... | 474/153 |
| 5,456,171 A * | 10/1995 | Biava et al. | ................. | 101/122 |
| 5,733,399 A | 3/1998 | Wood | .......................... | 156/138 |
| 6,174,825 B1 * | 1/2001 | Dutt | .............................. | 442/43 |
| 6,656,073 B1 | 12/2003 | Di Meco et al. | ............. | 474/267 |
| 2003/0017901 A1 | 1/2003 | Wilson et al. | ............... | 474/263 |

FOREIGN PATENT DOCUMENTS

| | | |
|---|---|---|
| DE | 1 877 972 | 7/1963 |
| DE | 25 20 943 | 11/1976 |
| DE | 25 32 190 | 1/1977 |
| DE | 25 57 025 | 6/1977 |
| GB | 1 240 123 | 7/1971 |
| SU | 1366744 A * | 1/1988 |
| SU | 1820089 A1 * | 6/1993 |

* cited by examiner

*Primary Examiner*—Vicky A Johnson
(74) *Attorney, Agent, or Firm*—Richard B. O'Planick

(57) ABSTRACT

A belt has a plurality of spaced apart teeth, at least one tensile cord extending along the belt spaced from the teeth, and a tooth stock material filling the teeth and encapsulating the tensile cord. A reinforcement cord is incorporated into the belt to generally follow along the tensile cord, the reinforcement cord having at least one overlay portion passing over the tensile cord and at least one loop portion extending down into a tooth to connect and secure the tooth to the tensile cord, whereby reinforcing the tooth against a separation from the belt due to shear forces.

20 Claims, 4 Drawing Sheets

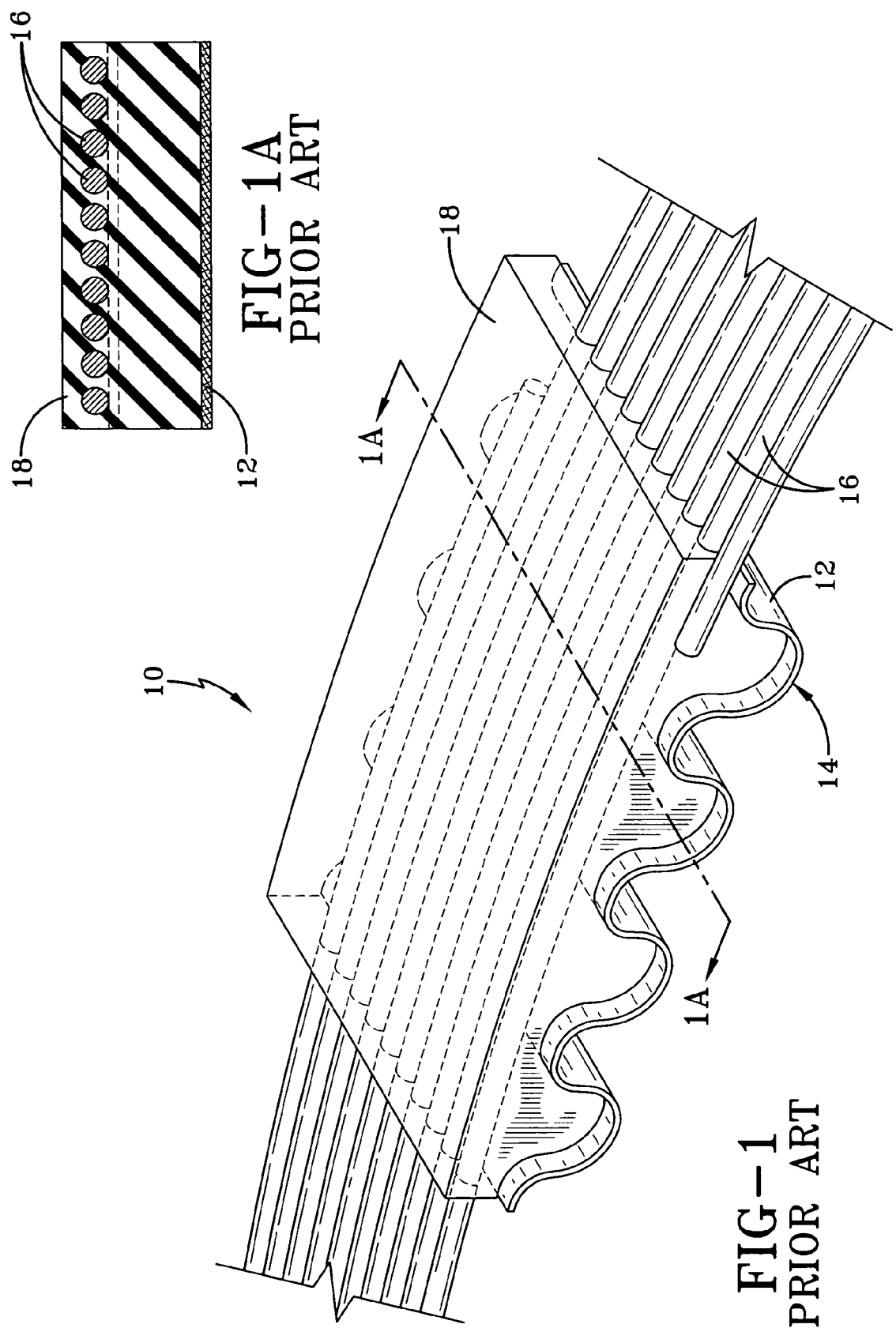

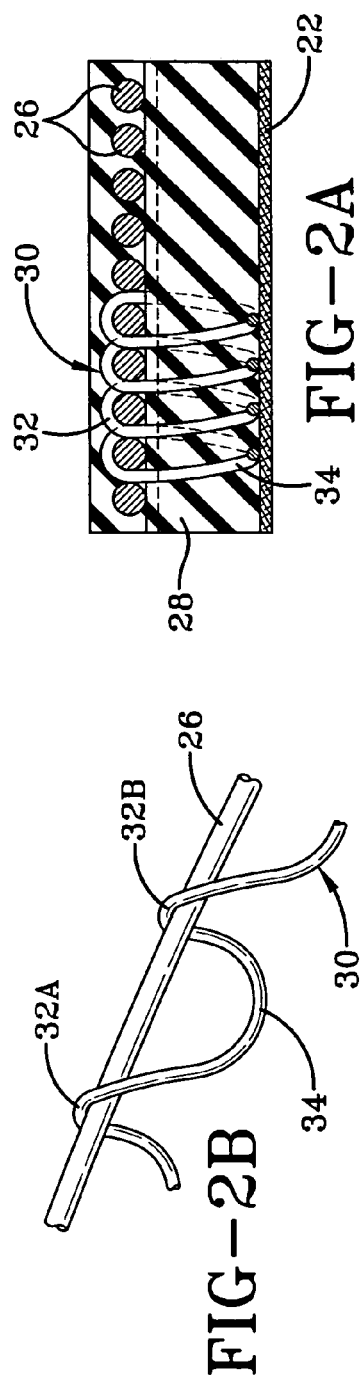
FIG-2A
FIG-2B
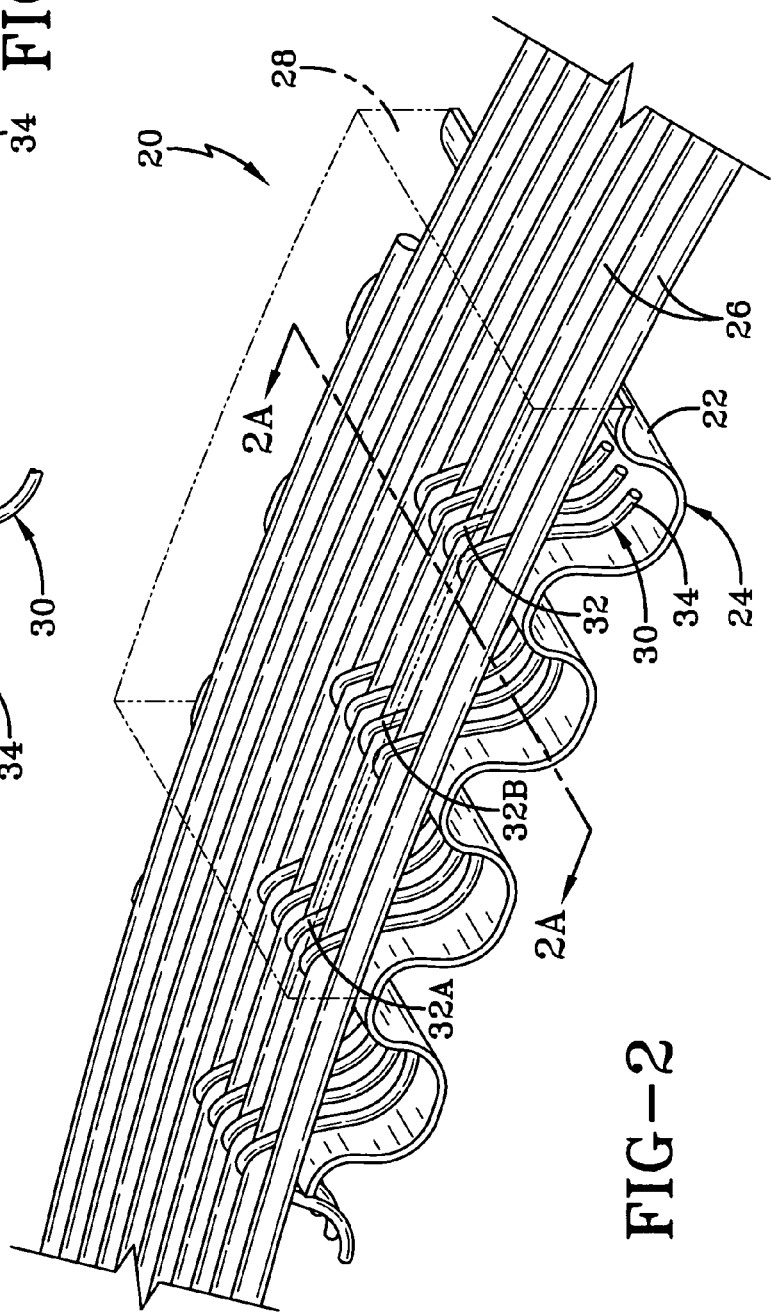
FIG-2

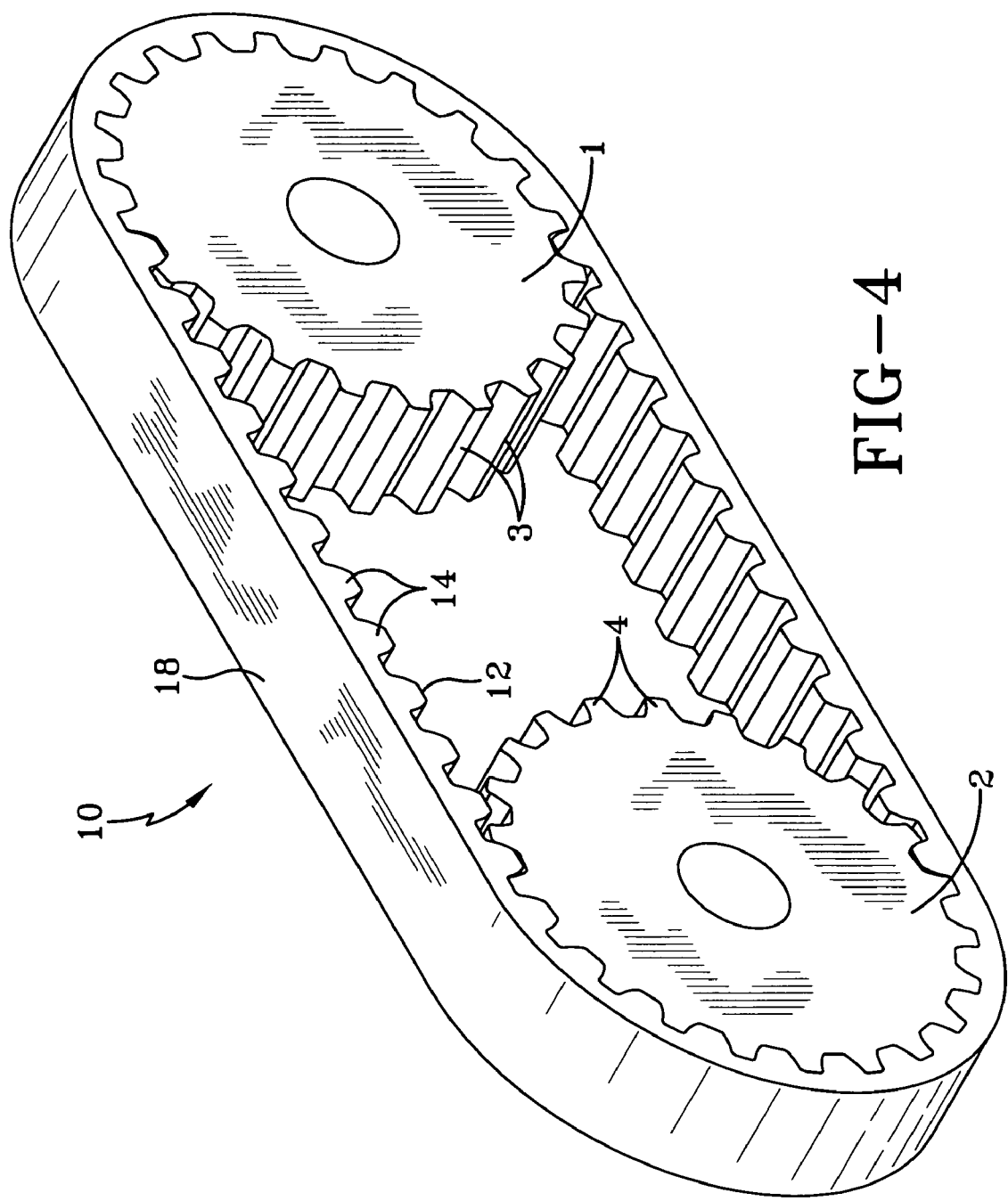

TOOTH SHEAR RESISTANT POWER TRANSMISSION BELT

FIELD OF THE INVENTION

The invention relates to synchronous drive belts and, more specifically, to drive belts having tooth shear resistant construction.

BACKGROUND OF THE INVENTION

Positive drive belts (also called interchangeably "synchronous" or "timing" belts) are well known and in common usage. Such belts are generally made of a resilient elastomer and are reinforced with a longitudinal tensile member that lies along the pitch line of the belt and is made up of a plurality of cords of a high elastic modulus. The cords may be made from glass, steel, aramid or carbon fiber in order to support the tensile loads in the belt. The belt includes spaced-apart teeth formed of neoprene, HNBR, urethane, polychloroprene, polyurethane, NBR, or other thermoset or thermoplastic elastomers available to the industry. The tooth surface may be reinforced with an abrasion resistant fabric such as nylon that resists abrasion and helps resist shearing off of the tooth from the cord under load.

While working well, belts of the conventional construction described above remain susceptible to damage or tooth breakage from shear forces when subjected to high loads as part of a duty cycle or during misuse. Conventional belts that rely on the face fabric of the belt as a means for reinforcing the belt teeth have proven ineffective. Such designs ultimately depend on adhesion of the elastomer to the cord and face fabric and on the shear strength of the elastomer. The face fabric structure cannot compensate for a failure of the adhesive or elastomer. Adding additional layers of fabric in the tooth region for the purpose of reinforcement adds to the cost of the belt. In addition, a belt tooth which has become detached from the tensile cord is often still loosely attached to an adjacent tooth by the detached face fabric and can move to positions that prevent proper engagement of the remaining belt teeth to the pulley teeth.

As a result, the industry remains in need of a belt configuration that is resistant to tooth shear. Optimally, the belt will be resistant to tooth shear failure and also have a soft mode of failure wherein the teeth remain loosely attached to the cord in a position that permits belt operation even if cracked or sheared off. Such a belt should further resist tooth shear damage resulting from temporary high loads that can occur during part of the duty cycle or during misuse. Still further, a belt configuration is needed within the industry that overcomes belt failure due to tooth shear in a cost effective, dependable manner.

SUMMARY OF THE INVENTION

The subject invention overcomes the deficiencies in conventional PD belt configurations and satisfies the needs of the industry in providing a belt structure that resists tooth shear damage and provides a soft mode of failure where the teeth remain attached to the belt tensile cord even if cracked or sheared off.

According to one aspect of the invention, the belt includes a spiral cord (also referred to interchangeably as a "stuffer" cord) or cords that is wrapped around one or more of the tensile cords of the belt. The path of the stuffer cord in such a configuration is substantially a helix that follows the helix of the tensile cord. A portion of the stuffer cord passes over the tensile cord forming a repeating angled pattern. Another portion of the stuffer cord passes under the tensile cord forming a loop that is molded into each tooth of the belt.

The spiral cord thus carries the tooth shearing loads and prevents the tooth load from damaging the face fabric and polymer of the tooth, thereby preventing the tooth from breaking off. It also prevents the tooth or teeth from separating from the cord when high loads exceed the tear strength of the tooth polymer or the adhesion of the tooth or teeth to the cord. In supporting the tooth against tooth shear forces, the spiral cord allows a lower cost face fabric and polymer to be used for a given level of performance.

According to another aspect of the invention, the belt teeth are locked to the tensile cord by a zigzag stuffer cord that passes alternatively over the tensile cord in opposite directions and into the teeth. In such a pattern, the stuffer cord follows generally along the path of the tensile cord, passing over the cord while above a tooth space and passing between the tensile cords alternately on the left and right sides of the tensile cord down into the belt tooth. Thus the zigzag cord also carries the tooth shearing loads and prevents the tooth load from damaging the face fabric and polymer of the tooth, thereby preventing the tooth from breaking off.

BRIEF DESCRIPTION OF THE DRAWINGS

The invention will be described by way of example and with reference to the accompanying drawings in which:

FIG. 1 is a top perspective view of a positive drive prior art belt shown partially in section for the purpose of illustration;.

FIG. 1A is a transverse section view of the belt of FIG. 1 taken along the line 1A—1A;

FIG. 2 is a top side perspective view of a positive drive belt configured pursuant to the invention with portions of the belt removed for the purpose of illustration;

FIG. 2A is a transverse section view of the belt of FIG. 2 taken along the line 2A—2A;

FIG. 2B is an enlarged perspective view of a tensile cord segment of the belt of FIG. 2 showing a spiral reinforcement cord segment wrapped therearound pursuant to the invention;

FIG. 4 is perspective view of a positive drive belt assembly configured pursuant to the prior art.

DETAILED DESCRIPTION OF THE INVENTION

Figure 3A:
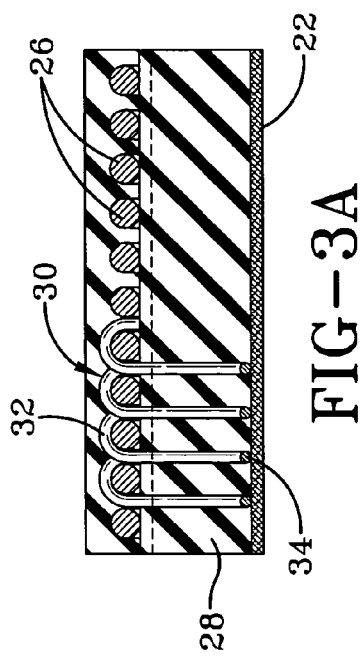
FIG. 3A is a transverse section view of the belt of FIG. 3 taken along the line 3A—3A.

Referring initially to FIGS. 1, 1A, and 4, a representative positive drive belt 10 is shown of a type in use within the industry. The belt 10 is referred interchangeably herein as a "positive drive", "PD", "synchronous", or "timing" belt. The components of the belt 10 include a face fabric 12 that follows the profile of a plurality of spaced apart belt teeth 14. A plurality of spaced apart, longitudinally extending tensile cords 16 extend along the belt and elastomeric material 18

(shown semi-transparent for illustration) is provided that fills in the teeth and encapsulates the tensile cords.

Current PD belts compose the tensile cords 16 from glass, steel, aramid or carbon fiber that support the tensile loads in the belt. Other materials may be substituted if desired without departing from the invention. The tensile cords 16 each may be formed from a single cord strand or consist of a plurality of cord strands if desired. The elastomeric material 18 of the belt may be made of neoprene, HNBR, urethane or other known elastomer. The face fabric 12 resists abrasive wear and helps resist shearing off of the teeth from the cord under load. The face fabric 12 is bonded to the elastomeric material which in turn is bonded to the cord and may, accordingly, become detached when subjected to repeated loads of sufficient magnitude. The durability of the face fabric, and its effectiveness in resisting tooth shear, therefore, is dependent upon the efficacy of the adhesives used to bond the fabric and the tensile cord and the shear strength of the elastomer near the cord.

FIG. 4 shows a typical PD belt 10 spanning between two drive pulleys 1, 2, each having, respectively, a series of teeth 3, 4 spaced and configured to mesh with the teeth 14 of the belt 10. Such a system is useful in myriad applications such as industrial and automotive uses. In practice, it is desirable for the belts to remain engaged with the pulleys in the event that one or more of the teeth 14 become disattached from the belt under shear loading. Keeping the teeth 14 attached to the cord, even if cracked or sheared off, is a highly desired objective. In addition, the belt 10 ideally will resist temporary high loads that can occur during part of a duty cycle or during misuse of the belt drive system.

As will be apparent from FIGS. 2, 2A, and 2B, a preferred embodiment of the present invention is manifest in a toothed belt 20 having face fabric 22, teeth 24, tensile cords 26, and elastomer 28 arranged and composed as in prior art belts described previously. Additionally, a spiral cord 30 is integrated into the belt. Spiral cord 30 is interchangeably referred to herein as a "reinforcement", "zigzag" or "stuffer" cord. Cord 30 may be a single cord or a bundled plurality of cords composed of any conventionally available material, such as, but not limited to, glass, steel, aramid or carbon fiber. While referred to in the singular as a "cord", use of the term is not intended to be so restricted and cord 30 may comprise a plurality of cords if desired. The spiral cord 30 is a reinforcement that follows along the path of a tensile cord 26, passing over the cord 26 while above a tooth space and looping down into a belt tooth to secure the tooth to the tensile cord. As shown in FIG. 2B, two adjacent overlay portions 32A 32B pass over the tensile cord 26 in a common direction in one embodiment, with loop portion 34 disposed therebetween. The path of the reinforcement cord 30 is a helix with a central axis that follows the helix of the tensile cord. The radius of the reinforcement cord from the helix axis varies as required to form the loop 34. It is small where the spiral cord 30 passes over the tensile cord and large where the loop passes through the tooth. While it is preferred that at least one reinforcement cord couple to each tensile cord along the belt, such is not a necessity for the practice of the invention. Some tensile cords may not have a reinforcement cord associated therewith while others may have a plurality of reinforcement cords wrapped therearound if desired for a particular application. Furthermore, the loop 34 may be formed around two or more tensile cords.

The spiral cord loop 34 extends down into a tooth and ties the tooth into the tensile cord 26. The spiral cord thus carries the tooth shearing loads and prevents the tooth load from damaging the face fabric and polymer of the tooth, thereby preventing the tooth from breaking off. It also prevents the tooth, or a group of teeth, from separating from the cord when high loads exceed the tear strength of the tooth polymer or the adhesion to the cord. The spiral cord will support the tooth shear forces, allowing lower cost face fabric and polymer to be used at a given level of performance.

It will be noted that the spacing between overlay portions and loop portions of the reinforcement cord complement the spacing between the teeth of the belt. Preferably, although not necessarily, the spacing is such as to provide that a loop portion of the reinforcement cord will extend down into each tooth along the belt and an overlay portion of the reinforcement cord is disposed at each gap between adjacent teeth along the belt. Other configurations and means for tying each tooth into the tensile cord by means of a reinforcement cord extending into the tooth, however, are intended to be within the contemplation of the present invention. The loop 34 may extend to the bottom of the tooth. It may also extend only partly into the tooth. Other combinations are also possible. For example, the portion of the reinforcement cord passing above the tensile cord may be extended along the belt so that the spiral or zigzag loops are formed only in every second, or third, or fourth tooth. The zigzag pattern can be made to form loops in the tooth and loops which pass between and above the tensile cords without crossing over them. Other configurations may also be envisioned by those skilled in the art without departing from the invention.

Moreover, in the event that a tooth or teeth are sheared from the belt, the reinforcing cord 30 acts to maintain an association of the severed teeth with the belt in a soft mode of failure in which the belt is less likely to be forced off of the pulleys. (Note that the numeral 30 is used to describe both the spiral reinforcing cord in FIG. 2B and the zigzag reinforcing cord in FIG. 3B. Hence, this statement applies to both.) This will allow a limited period of belt operation until the belt may be repaired or replaced.

Figure 3B:
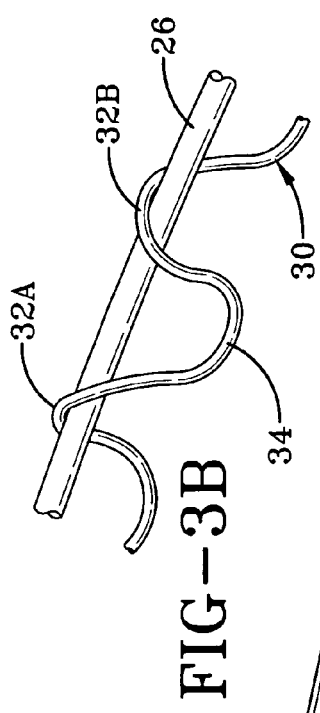
FIG. 3B is an enlarged section view of a tensile cord segment of the belt of FIG. 3 showing a spiral reinforcement cord segment wrapped therearound pursuant to the invention.
Figure 3:
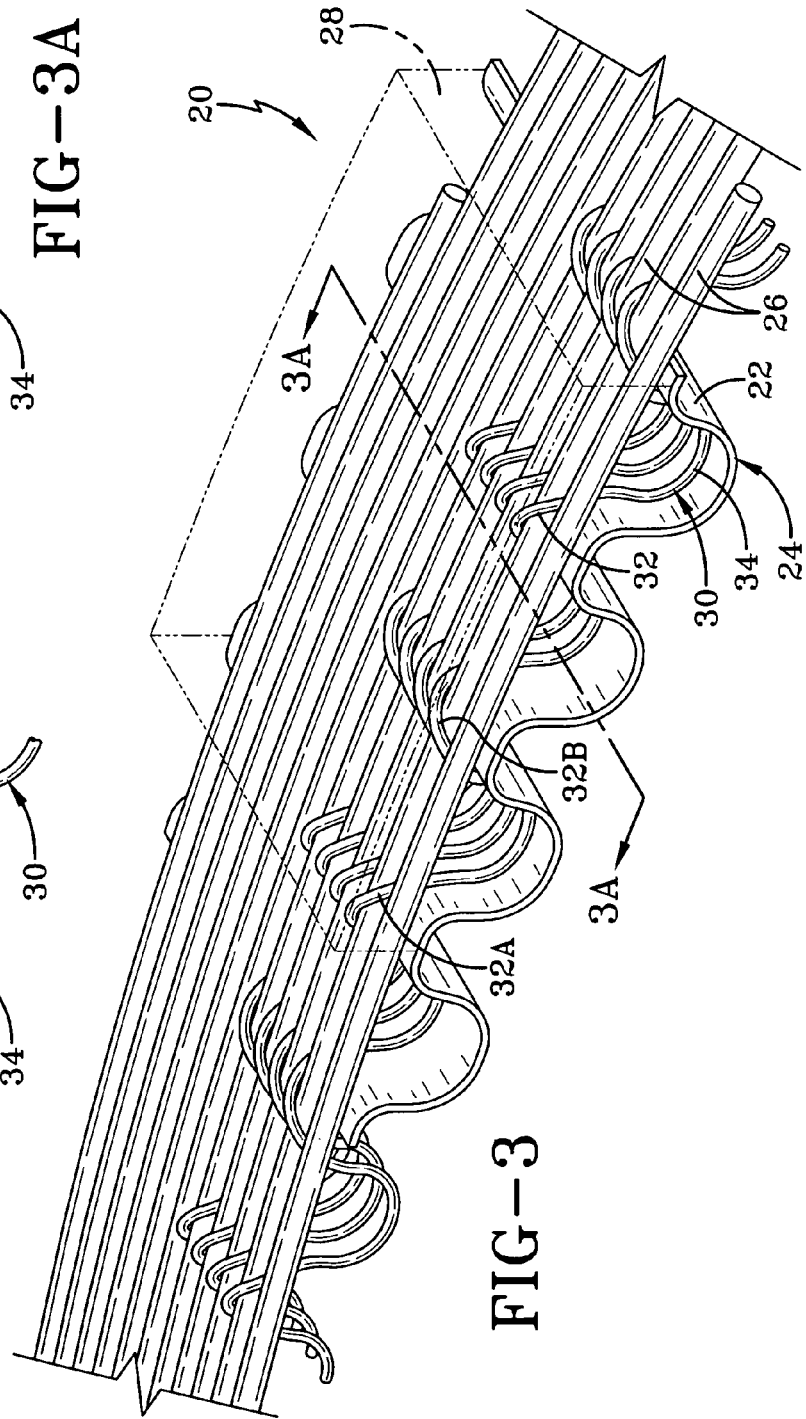
FIG. 3 is a top side perspective view of an alternative embodiment belt configured pursuant to the invention with portions of the belt removed or shown in broken line for the purpose of illustration.

FIGS. 3, 3A, and 3B illustrate an alternatively configured belt configured pursuant to the invention. In the embodiment shown, the stuffer cord 30 follows along the path of the tensile cord, passing over the cord while above a tooth space and passing alternately on the left and right sides of the cord down as a loop into the belt tooth to secure it to the tensile cord. As shown in FIG. 3B, two overlay portions 32A and 32B in the alternate embodiment extend over the tensile cord 26 in opposite directions, with the loop portion 34 disposed therebetween. Such a configuration may be referred to as a "zigzag" pattern. Other patterns may also be deployed. For example, without any intended limitation on other alternatives, the reinforcement cord 30 may be configured as a braided stuffer cord which includes interlocked left and right hand cord helices.

From the foregoing, it will be appreciated that the subject belt of the invention satisfies the need of the industry for a highly durable belt capable of operating in a soft failure mode. The belt resists the occurrence of tooth shear and acts by means of the reinforcement cord 30 to tie each tooth into the tensile cords 26. An integrated belt of superior strength and performance results. In addition, as previously explained, the high structural integrity achieved by the presence of the reinforcement cord 30 allows for a use of less expensive materials in the tooth stock as well as the face fabric.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. In a belt having a plurality of spaced apart teeth, at least one tensile cord extending along the belt spaced from the teeth, and an elastomeric material filling the teeth and encapsulating the tensile cord, the improvement comprising:
at least one reinforcement cord generally following along the at least one tensile cord having at least one overlay loop portion having a relatively small radius of curvature passing over with the tensile cord and at least one loop portion having a larger radius of curvature extending down into at least one tooth to secure the tooth to the tensile cord.

2. A belt according to claim 1 wherein the at least one reinforcement cord comprises an alternating series of overlay and loop portions, each overlay portion having a radius of curvature smaller than the radius of curvature of an adjacent loop portion.

3. A belt according to claim 1, wherein the at least one reinforcement cord follows the tensile cord in at least one substantially spiral configuration having a radius and pitch variable along a spiral length of the reinforcement cord.

4. A belt according to claim 1, wherein the at least one reinforcement cord passes alternately on the left and right sides of the tensile cord down into the belt teeth to secure the belt teeth to the tensile cord.

5. A belt according to claim 1, wherein a path of the at least one reinforcement cord along the at least one tensile cord comprises at least one helix having a radius and pitch variable along a length of the reinforcement cord.

6. A belt according to claim 1, wherein the belt comprises at least one reinforcement cord composed of non-metallic material associated with each tensile cord.

7. A belt according to claim 6, wherein the at least one reinforcement cord wraps around in a spiral contacting relationship with a respective one plurality of tensile cords and is configured having a variable pitch and radius along a spiral path.

8. A belt according to claim 1, wherein the belt comprises a plurality of tensile cords, at least one selected tensile cord having at least one reinforcement cord wrapped in contacting relationship therearound, and each reinforcement cord having a variable pitch and radius along a reinforcement cord path.

9. A belt according to claim 8, wherein at least one tensile cord remains unwrapped by a reinforcement cord.

10. A belt system of the type having at least one driven pulley and a drive belt extending about the pulley and imparting movement thereto, the driven pulley having a series of spaced teeth and the belt having a plurality of spaced apart teeth intermeshing with the pulley teeth, at least one tensile cord extending along the belt spaced from the teeth, and an elastomeric material filling the teeth and encapsulating the tensile cord, the improvement comprising:
at least one reinforcement cord generally following along the at least one tensile cord and having at least one overlay portion of relatively smaller radius of curvature passing over the at least one tensile cord and at least one loop portion of relatively larger radius of curvature extending down into a tooth to secure the tooth to the at least one tensile cord.

11. A belt system according to claim 10 wherein the at least one reinforcement cord comprises an alternating series of overlay and loop portions, the overlay and loop portions having differing curvature radii.

12. A belt system according to claim 10, wherein the at least one reinforcement cord follows the at least one tensile cord in a substantially spiral configuration and the reinforcement cord having a radius and pitch that changes along a spiral path.

13. A belt according to claim 10, wherein the at least one reinforcement cord passes alternately on the left and right sides of the at least one tensile cord down into the belt tooth to secure the belt teeth to the tensile cord.

14. A belt according to claim 10, wherein a path of the reinforcement cord along the tensile cord comprises a helix, and the reinforcement cord having a radius and pitch that changes along a helical path.

15. A belt according to claim 10, wherein the belt comprises a plurality of tensile cords, selective tensile cords having at least one reinforcement cord wrapped therearound in contacting relationship therewith.

16. In a belt having a plurality of spaced apart teeth, a plurality of tensile cords extending along the belt spaced from the teeth, and an elastomeric material filling the teeth and encapsulating the tensile cord, the improvement comprising:
at least one reinforcement cord generally following along at least one tensile cord and having an overlay portion of relatively smaller radius of curvature passing over the at least one tensile cord and a loop portion of relatively larger radius of curvature extending down from the at least one tensile cord.

17. A belt according to claim 16 wherein the at least one reinforcement cord is composed of non-metallic material.

18. A belt according to claim 16, wherein the belt comprises a plurality of tensile cords and at least one reinforcement cord, the at least one reinforcement cord wrapping around at least one tensile cord in at least one substantially spiral configuration having a changing radius and pitch along a spiral path.

19. A belt according to claim 16, wherein the belt comprises a plurality of tensile cords, selective tensile cords having at least one reinforcement cord wrapped therearound in contacting relationship therewith and having a changing radius and pitch along a reinforcement cord path.

20. A belt according to claim 16, wherein the at least one reinforcement cord overlay portion is positioned substantially at a space between two adjacent belt teeth and the reinforcement cord loop portion extends down and is molded into a tooth to secure the tooth to the tensile cord.

* * * * *